United States Patent
Cheung et al.

(10) Patent No.: US 10,254,811 B2
(45) Date of Patent: Apr. 9, 2019

(54) ON-CHIP POWER SEQUENCE VALIDATOR AND MONITOR

(71) Applicant: Advanced Micro Devices, Inc., Sunnyvale, CA (US)

(72) Inventors: Donald L. Cheung, Austin, TX (US); Anup Chakravarthi Suggula, Austin, TX (US)

(73) Assignee: Advanced Micro Devices, Inc., Santa Clara, CA (US)

(*) Notice: Subject to any disclaimer, the term of this patent is extended or adjusted under 35 U.S.C. 154(b) by 91 days.

(21) Appl. No.: 15/275,034

(22) Filed: Sep. 23, 2016

(65) Prior Publication Data
US 2018/0088649 A1 Mar. 29, 2018

(51) Int. Cl.
| G06F 1/26 | (2006.01) |
| G06F 1/28 | (2006.01) |
| G06F 1/32 | (2006.01) |
| G06F 11/07 | (2006.01) |
| G06F 1/3206 | (2019.01) |
| G06F 1/3296 | (2019.01) |

(52) U.S. Cl.
CPC ............ *G06F 1/28* (2013.01); *G06F 1/263* (2013.01); *G06F 1/3206* (2013.01); *G06F 1/3296* (2013.01); *G06F 11/0757* (2013.01)

(58) Field of Classification Search
CPC ....... G06F 1/263; G06F 1/3206; G06F 1/3296
See application file for complete search history.

(56) References Cited

U.S. PATENT DOCUMENTS

| 7,469,353 | B2 | 12/2008 | Mundada et al. |
| 8,386,806 | B2 | 2/2013 | Ooi et al. |
| 2007/0236294 | A1* | 10/2007 | Delano ............... H03F 1/0244 330/297 |
| 2014/0223236 | A1* | 8/2014 | Hao ................... G06F 11/2236 714/31 |
| 2016/0093377 | A1* | 3/2016 | Prakash ............. G11C 7/1072 711/103 |
| 2017/0249097 | A1* | 8/2017 | Eguchi ............... G06F 3/0625 |

* cited by examiner

*Primary Examiner* — Jigar P Patel
(74) *Attorney, Agent, or Firm* — Meyertons Hood Kivlin Kowert and Goetzel PC; Rory D. Rankin

(57) ABSTRACT

Systems, apparatuses, and methods for monitoring power rails during power sequences are disclosed. An apparatus includes one or more voltage regulators, a plurality of registers, and control logic. The control logic is configured to monitor a power rail generated by a voltage regulator. The control logic generates and stores an indication of pass or failure in a first register for the power rail during a power sequence. The control logic enables the first register to be read by an external device subsequent to completion of the power sequence. In another embodiment, the control logic generates a pass indicator if the power rail is less than a first voltage value on a first boundary of a timing interval and if the power rail is greater than a second voltage value on a second boundary of the timing interval. Otherwise, a fail indicator is generated.

20 Claims, 8 Drawing Sheets

ON-CHIP POWER SEQUENCE VALIDATOR AND MONITOR

BACKGROUND

Description of the Related Art

A typical integrated circuit (IC) being designed and used in modern day computing systems often utilizes multiple different supply voltages to supply power to different portions of the IC. Each supply voltage typically has a separate power sequencing requirement. Power sequence issues at silicon and board bring-up are hard to debug. Failures of the power sequence can cause the system to malfunction, often with no indication as to why the failure occurred. Power sequence failures can also be an early indicator of damaged silicon, which can be useful in yield applications when coupled with accelerated degradation studies.

When a power sequence failure occurs on a typical system, the current approach for performing power rail failure analysis involves using oscilloscopes and/or logic analyzers to determine the cause of the failure. This can be a painstaking and lengthy process. Additionally, even when the cause of failure is determined, there are typically no indications of marginally failing rails nor of out of sequence rails.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
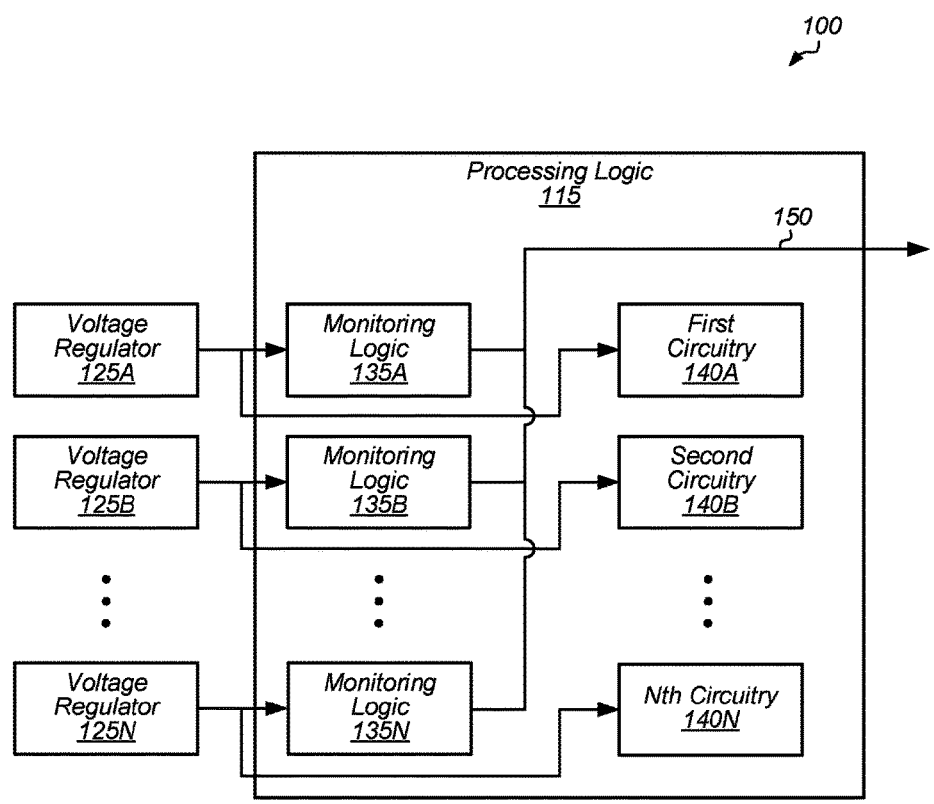
FIG. 1 is a block diagram of one embodiment of a system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for monitoring power rails during power sequences are disclosed herein. In one embodiment, a system includes one or more voltage regulators, a plurality of registers, processing logic, and control logic. The control logic is configured to monitor a power rail generated by a voltage regulator and validate the power rail during a power sequence. The power rail provides a supply voltage to at least a portion of the processing logic. The control logic generates and stores an indication of pass or failure in a first register for the power rail during the power sequence. The control logic provides the indication to an external entity subsequent to completion of the power sequence. Depending on the embodiment, the power sequence can be a power-up sequence, a power-down sequence, or a power sequence for transitioning between different power modes.

In some embodiments, the control logic is configured to monitor a plurality of power rails generated by a plurality of voltage regulators. The control logic generates and stores indications of pass or failure in a plurality of registers for the plurality of power rails during a power sequence. In one embodiment, a passing sequence is indicated by all fail registers being clear when the last time bound register has been passed. The control logic can also generate a single pass or failure indication for the plurality of power rails.

In one embodiment, the control logic is configured to determine if a power rail meets criteria specified in one or more first registers during a time interval specified in one or more second registers. The control logic generates a pass indication if the power rail meets the criteria or the control logic generates a fail indication if the power rail does not meet the criteria.

In one embodiment, the control logic is configured to sample the power rail at one or more times during the power sequence. The control logic stores sample values of the power rail in one or more registers from the one or more times. Also, the control logic enables the one or more registers to be read by an external device subsequent to completion of the power sequence.

In one embodiment, the control logic is configured to determine whether the power rail is less than a first voltage value on a first boundary of a timing interval, with the first voltage value stored in a second register, and with the first boundary stored in a third register. The control logic is also configured to determine whether the power rail is greater than a second voltage value on a second boundary of the timing interval, with the second voltage value stored in a fourth register, and with the second boundary stored in a fifth register. The control logic generates and stores a pass indication in the first register responsive to determining the power rail is less than the first voltage value on the first boundary and responsive to determining the power rail is greater than the second voltage value on the second boundary. Alternatively, the control logic generates and stores a fail indicator in the first register responsive to determining the power rail is greater than the first voltage value on the first boundary or responsive to determining the power rail is less than the second voltage value on the second boundary.

Referring now to FIG. 1, a block diagram of one embodiment of a system 100 is shown. System 100 includes processing logic 115 and voltage regulators 125A-N, which are representative of any number and type of voltage regulators. Processing logic 115 is representative of any number and type of processing units which can be included in system 100. For example, in one embodiment, processing logic 115 can include a single processing unit (e.g., central processing unit (CPU), graphics processing unit (GPU), accelerated processing unit (APU), field-programmable gate array (FPGA)) and first circuitry 140A, second circuitry 140B, and N$^{th}$ circuitry 140N can be different portions of the single processing unit, with each portion operating at a different supply voltage. In another embodiment, processing logic 115 can include multiple processing units, and first circuitry 140A, second circuitry 140B, and nth circuitry 140N can be different portions of the multiple processing units which operate at different supply voltages.

In one embodiment, each of voltage regulators 125A-N can generate a different supply voltage for processing logic 115. For example, in one embodiment, voltage regulator 125A can generate 1.8 volts (V), voltage regulator 125B can generate 1.5 V, and voltage regulator 125N can generate 1.2 V. In other embodiments, other numbers of supply voltages can be generated at different voltage levels. Also, in some embodiments, one or more voltage regulators 125A-N can generate negative voltage supplies.

In one embodiment, each voltage regulator 125A-N is coupled to corresponding monitoring logic 135A-N. In one embodiment, each monitoring logic 135A-N is configured to monitor the supply voltage generated by a corresponding voltage regulator 125A-N during a power sequence. The power sequence can be a power-up sequence, a power-down sequence, or a switch from a first power mode to a second power mode. In another embodiment, monitoring logic 135A-N can monitor and measure the electric current draw of a given power rail. For example, the voltage drop across a resistor can be measured to determine the current generated by the given power rail. Other techniques for measuring current can also be utilized. Although monitoring logic 135A-N as shown as part of processing logic 115, in another embodiment, monitoring logic 135A-N can be implemented separately from and external to processing logic 115.

In one embodiment, each monitoring logic unit 135A-N generates a pass or fail indicator based on the timing and voltage level status of the input power rail during the power sequence. In another embodiment, the pass or fail indicator can be generated based on the measured current draw (in addition to or independently of the timing and voltage level status) of the input power rail during the power sequence. In one embodiment, these pass or fail indicators can be chained together and conveyed to an external output via interface 150. In another embodiment, the outputs from separate ones of monitoring logic 135A-N can be connected to separate external output interfaces. In a further embodiment, one of the monitoring logic units 135A-N can generate a single pass/fail indicator for all of the power rails based on the pass/fail indicators generated by all of the monitoring logic units 135A-N. In some embodiments, each monitoring logic unit 135A-N can also generate additional information about the power-up sequence of the corresponding supply voltage. One example of a monitoring logic unit is described in more detail below in the discussion associated with FIG. 2.

In various embodiments, system 100 can correspond to any of various types of computer systems or computing devices, including, but not limited to, a personal computer system, desktop computer, laptop or notebook computer, supercomputer, tablet, phone, smartphone, mainframe computer system, handheld computer, workstation, network computer, a consumer device, server, file server, application server, storage server, or in general any type of computing system or device.

Figure 2:
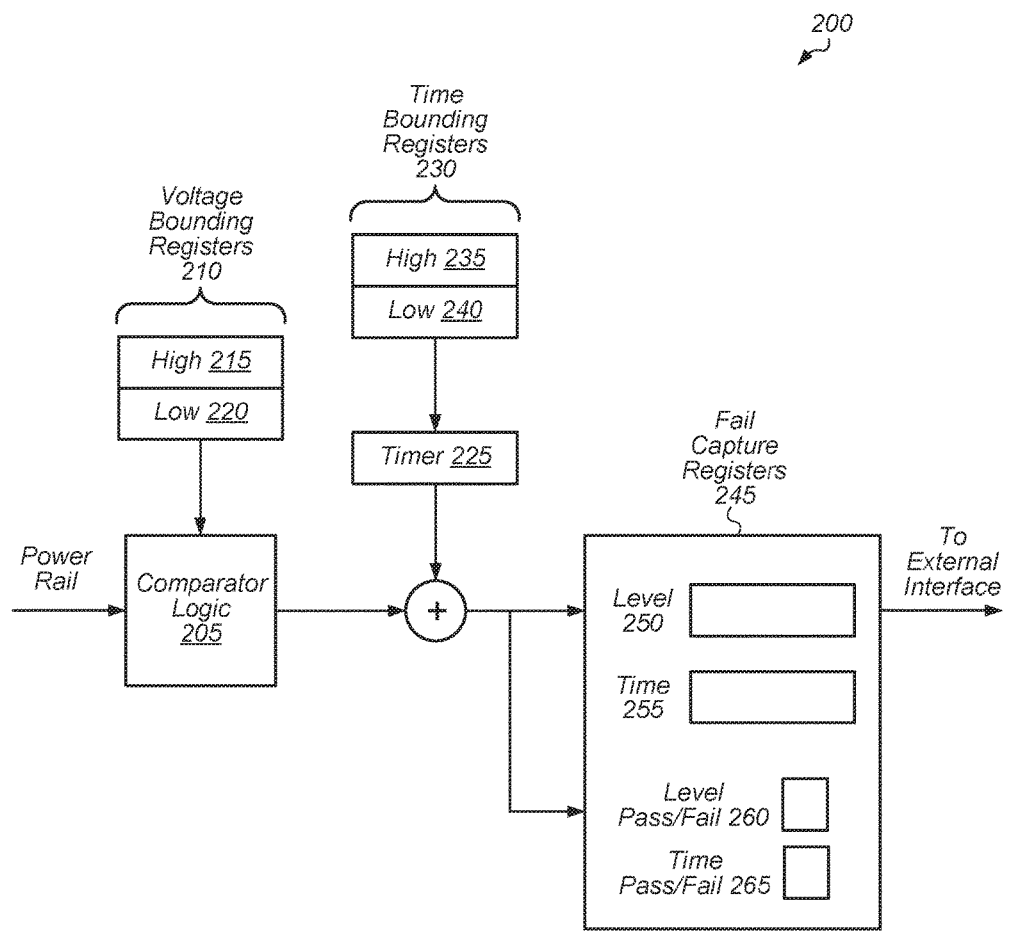
FIG. 2 is a block diagram of one embodiment of power rail monitoring logic.

Turning now to FIG. 2, a block diagram of one embodiment of power rail monitoring logic 200 is shown. In one embodiment, logic 200 can be implemented within each of monitoring logic units 135A-N (of FIG. 1). Logic 200 includes circuitry for monitoring an input voltage rail during a power sequence, circuitry for capturing level and timing data associated with the input voltage rail, and circuitry for allowing the captured data to be retrieved by an external device. In one embodiment, logic 200 is powered by a power rail which is separate from the voltage rail being monitored. In other embodiments, logic 200 can be powered using other power sources (e.g., battery).

In one embodiment, comparator logic 205 is configured to receive a power rail as an input and to sample and/or compare the input power rail to the high value 215 and low value 220 stored in voltage bounding registers 210. In one embodiment, comparator logic 205 is configured to monitor an over voltage condition and/or an under voltage condition on the input power rail by comparing the input power rail to high value 215 and/or low value 220. In some embodiments, comparator logic 205 can sample and compare the input power rail to high value 215 and/or low value 220 at times indicated by time bounding registers 230. As used herein, the term "register" refers to any type of storage location which can be written to and read from. A register can also store any number of bits, depending on the embodiment. Registers can be implemented in various fashions. For example, registers can be implemented as any sort of clocked storage devices such as flops, latches, etc. Registers can also be implemented as memory arrays, where a register address is used to select an entry in the array. Other types of implementations of registers are possible and are contemplated.

In one embodiment, voltage bounding registers 210 and time bounding registers 230 can be programmed with values from software via an external interface. For example, a high voltage value can be written by software into the high register 215 and a low voltage value can be written by software into the low register 220. The values in high register 215 and low register 220 can be utilized by comparator 205 to compare against the input power rail. Additionally, the comparisons of the input power rail to high register 215 and low register 220 can be used to generate the level pass/fail indicator 260 stored in fail capture registers 245. In other embodiments, voltage bounding registers 210 can include a single register to store a single voltage level or voltage bounding registers 210 can include three or more registers to store three or more separate voltage levels. Although not shown in FIG. 2, in another embodiment, monitoring logic 200 can also include registers for storing current threshold values to compare against the measured current on the input power rail. In this embodiment, fail capture registers 245 can also include a register for storing the measured current and a current pass/fail indicator. Additionally, throughout the remainder of this disclosure, while methods and mechanisms are described for capturing voltage values and voltage transitions and determining if these values and transitions meet certain criteria, it should be understood that these methods and mechanisms can also be utilized to capture current measurements and determine if the captured current measurements meet programmable criteria.

Depending on the embodiment, any type of representation can be used to encode captured measurements in registers 210, 230, and 245. For example, in one embodiment, if a 10-bit register is used for one of registers 210, 230, and 245, a value of all 0's could be considered 0 Volts (V) (although it could be considered equal to a negative or positive value in other embodiments) and the value of all 1's could be considered 10 V (or some other appropriate value). Accordingly, in this embodiment, each step size would be equal to (10 V÷(1023)). In other embodiments, all 0's and all 1's can be considered equal to other values. Additionally, in other embodiments, an N-bit value stored in an N-bit register can use a first portion of the N-bit value to encode an integer portion of the voltage value and a second portion of the N-bit value to encode a fractional portion of the voltage value. In a further embodiment, the values stored in any of registers 210, 230, and 245 (whether binary or otherwise) can be converted into a voltage value using a conversion table or other conversion mechanism. Other techniques for encoding values in registers to represent voltage, time, current, or other measurements are possible and are contemplated.

Additionally, a first time boundary value can be written into high register 235 and a second time boundary value can be written into low register 240. In one embodiment, the values stored in time bounding registers 230 can be used by timer 225 to determine if the voltage rail passes a timing test. For example, comparator logic 205 can determine if a voltage transition occurs within the interval defined by time bounding registers 230. The status of the timing test can be stored as time pass/fail indicator 265 in fail capture registers 245. Depending on the embodiment, timer 225 can be a global timer which is used by multiple monitoring logic units or timer 225 can be a local timer utilized by a single monitoring logic unit. If a local timer is utilized by a given logic unit, this local timer can be synchronized with other timers of other logic units monitoring other power rails.

In one embodiment, if a specified voltage transition occurs within a specified interval, comparator logic 205 can generate a pass indication for indicators 260 and 265 in fail capture registers 245. Otherwise, if the specified voltage transition does not occur, comparator logic 205 can generate a fail indication for indicator 260. If the specified voltage transition occurs but not within the specified interval, then comparator logic 205 can generate a pass indication for indicator 260 and a fail indication for indicator 265.

In one embodiment, fail capture registers 245 can include a register 250 for storing the voltage level at the end of the power sequence and a register 255 for storing the time of a captured voltage transition. In other embodiments, fail capture registers 245 can include additional registers to store additional information. In a further embodiment, fail capture registers 245 can store a portion of the data shown in FIG. 2. For example, in one embodiment, fail capture registers 245 can store a single pass/fail indicator to indicate if the voltage rail met the various constraints (e.g., voltage levels, timing constraints) during the power sequence. The data stored in fail capture registers 245 can be read via an external interface by other logic for extracting the pass/fail indicators and any additional information. In some embodiments, the data stored in fail capture registers 245 can be protected and accessed only via a secure access method. For example, in one embodiment, the data stored in fail capture registers 245 can be encrypted. In another embodiment, an external device is required to provide a password, secret, key, or the like before accessing the data stored in fail capture registers 245. In other embodiments, other techniques for preventing unauthorized access to the data stored in fail capture registers 245 are possible and are contemplated.

Figure 3:
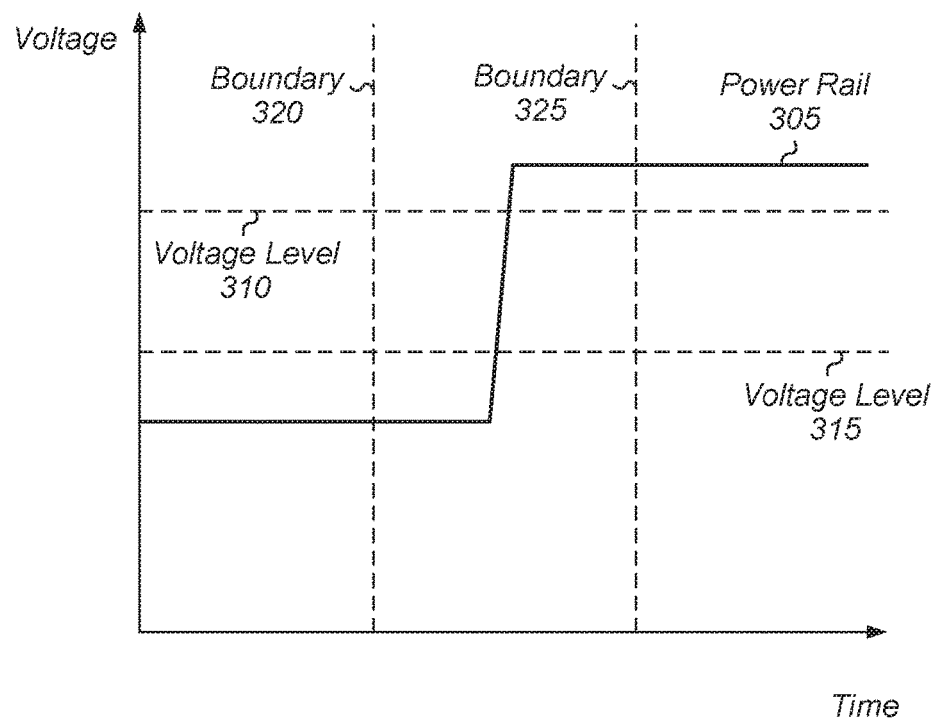
FIG. 3 illustrates one embodiment of voltage and time boundary levels for monitoring and validating a power rail.

Referring now to FIG. 3, one embodiment of voltage and time boundary levels for monitoring and validating a power rail is shown. In one embodiment, control logic (e.g., logic 200 of FIG. 2) is configured to monitor and validate power rail 305 during a power sequence. In one embodiment, the power sequence is a power-up sequence. In one embodiment, voltage levels 310 and 315 are stored in voltage bounding registers (e.g., voltage bounding registers 210) and timing boundaries 320 and 325 are stored in time bounding registers (e.g., time bounding registers 230).

In one embodiment, control logic validates that the transition from a low voltage to a high voltage for power rail 305 happens during the time window defined by timing boundaries 320 and 325. Accordingly, in this embodiment, control logic samples the voltage of power rail 305 at boundary 320 and validates that the voltage is less than voltage level 315. In some embodiments, control logic can validate that the voltage is less than or equal to voltage level 315 at boundary 320. Then, control logic samples the voltage of power rail 305 at boundary 325 and validates that the voltage is greater than voltage level 310. In some embodiments, control logic can validate that the voltage is greater than or equal to voltage level 310 at boundary 325. If power rail 305 is less than voltage level 315 at boundary 320 and greater than voltage level 310 at boundary 325, then control logic generates a pass indicator for power rail 305. Otherwise, if power rail 305 is greater than voltage level 315 at boundary 320 or power rail 305 is less than voltage level 310 at boundary 325, control logic generates a fail indicator for power rail 305. Then, control logic can provide the pass/fail indicator to an external entity. Control logic can also store other data, such as the measured voltage levels at boundaries 320 and 325, and provide this data to an external entity.

It should be understood that FIG. 3 is merely one example of utilizing voltage and timing boundary levels for monitoring and validating a power rail during a power sequence. In other embodiments, other schemes can be implemented for monitoring and validating a power rail during a power sequence. For example, in another embodiment, a single timing boundary level can be utilized, and a power rail can be monitored to see if it is within a specified voltage range at the single timing boundary. Also, in a further embodiment, a single voltage boundary level can be utilized, and a power rail can be monitored to determine if it is above or below the single voltage boundary level at a specified time. Other embodiments can utilize three or more timing boundary levels and/or three or more voltage boundary levels to track more complex patterns of power rails during a power sequence.

Figure 4:
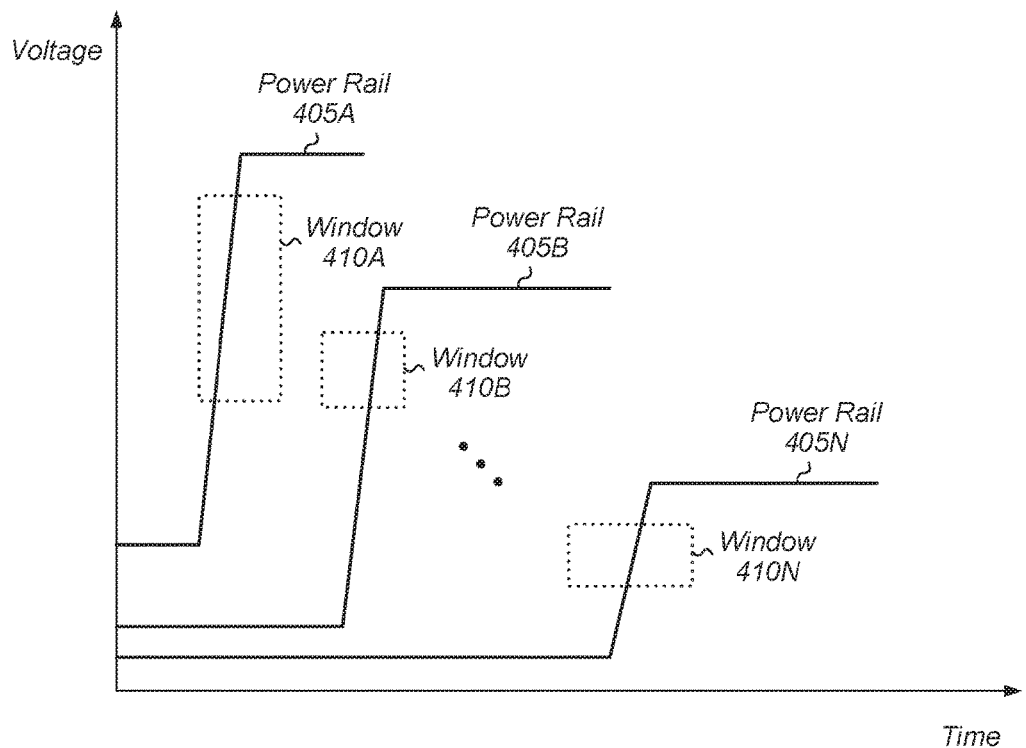
FIG. 4 illustrates one embodiment of boundary windows for monitoring and validating multiple power rails.

Turning now to FIG. 4, one embodiment of boundary windows for monitoring and validating multiple power rails is shown. In one embodiment, control logic is configured to monitor and validate multiple power rails 405A-N during a power sequence. Power rails 405A-N are representative of any number of power rails utilized by a computing device or computing system. The control logic can be integrated into the computing device or computing system or the control logic can be external to the computing device or computing system.

In one embodiment, control logic monitors power rail 405A to validate that a voltage transition occurs during a specified window 410A. In one embodiment, window 410A is specified using programmable voltage level and boundary registers. In other embodiments, window 410A can be specified using other mechanisms. Control logic also monitors power rails 405B and 405N to ensure that the voltage transition occurs during specified windows 410B and 410N, respectively. If all power rails 405A-N transition during their specified windows 410A-N, then control logic generates a pass indicator for the power sequence. Otherwise, if any of power rails 405A-N fail to transition during their specified windows 410A-N, control logic generates a fail indicator and additional information (e.g., sampled voltage levels at specified times) associated with the failing power rail(s). The pass/fail indicator and any additional information can be provided to an external entity when the power sequence is completed.

Figure 5:
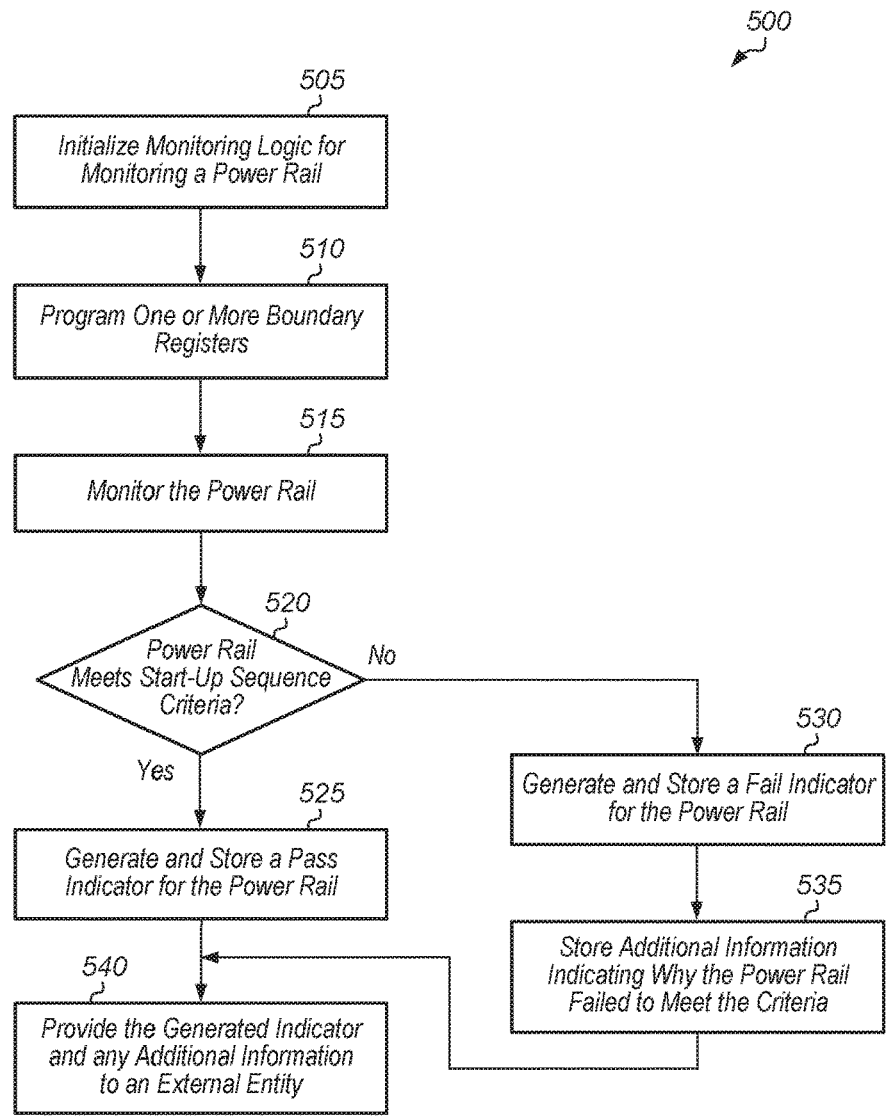
FIG. 5 is a generalized flow diagram illustrating one embodiment of a method for monitoring a power rail.
Figure 6:
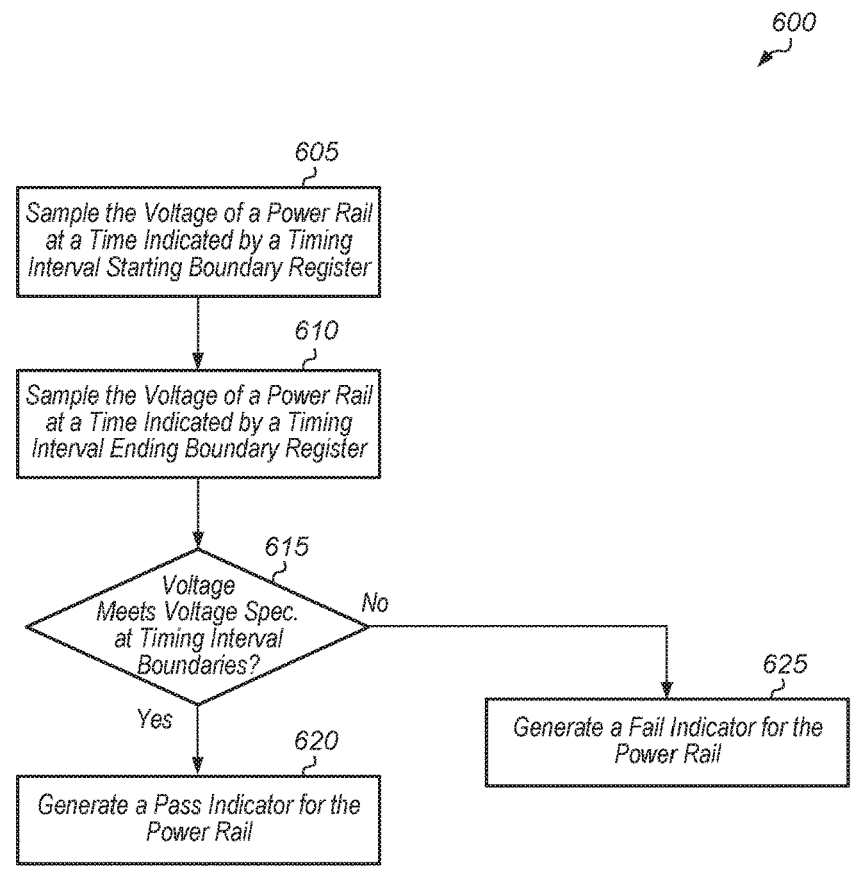
FIG. 6 is a generalized flow diagram illustrating one embodiment of a method for determining if a power rail meets power sequence criteria.
Figure 7:
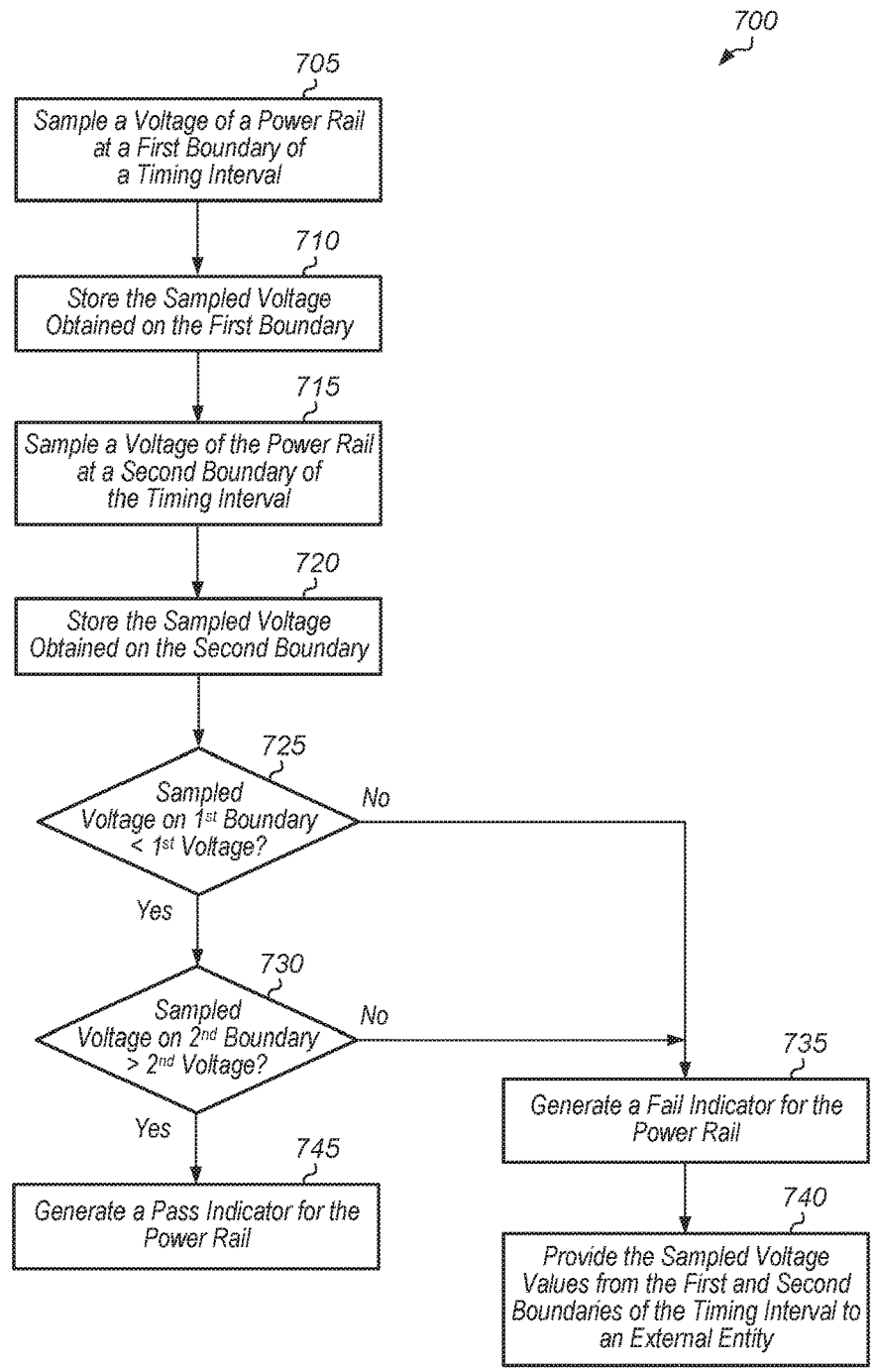
FIG. 7 is a generalized flow diagram illustrating one embodiment of a method for determining if a power rail meets a voltage specification at the boundaries of a programmable timing interval.
Figure 8:
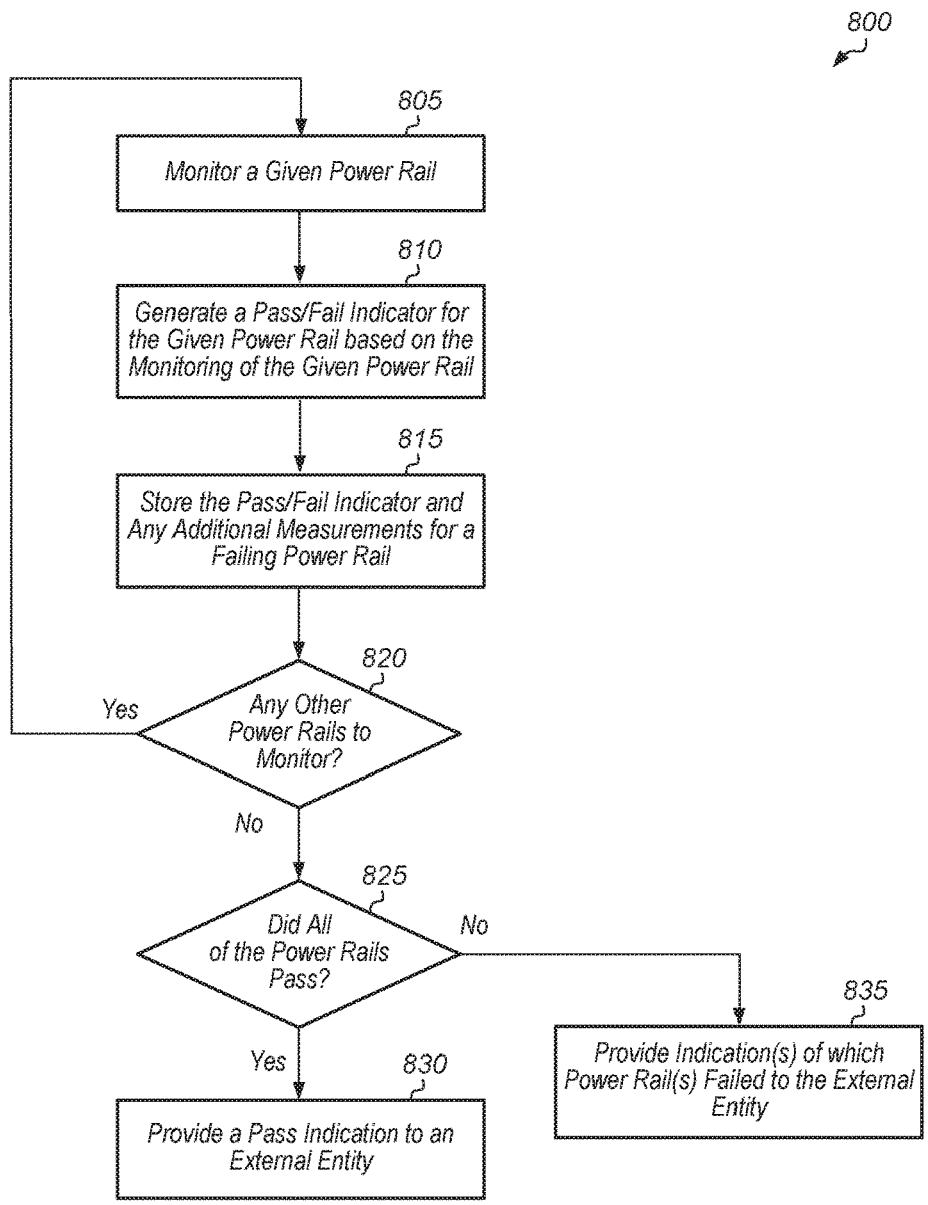
FIG. 8 is a generalized flow diagram illustrating one embodiment of a method for monitoring multiple power rails.

Referring now to FIG. 5, one embodiment of a method 500 for monitoring a power rail is shown. For purposes of discussion, the steps in this embodiment and those of FIGS. 6-8 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

Monitoring logic for monitoring a power rail is initialized (block 505). It is noted that the monitoring logic can also be referred to as control logic. As part of initializing the monitoring logic, a timer can be initiated. Also, one or more boundary registers are programmed (block 510). Depending on the embodiment, the boundary registers can include one or more registers for storing expected voltage levels and one or more registers for storing timing boundaries of when the voltage levels should be reached.

Next, the monitoring logic monitors the power rail (block 515). Then, the monitoring logic determines if the power rail meet the criteria specified for the power sequence (conditional block 520). Depending on the embodiment, the power sequence can be a power-up sequence or a power-down sequence. In other embodiments, the power sequence can also be a power sequence for transitioning to a low power mode. The criteria for passing the power sequence can vary from embodiment to embodiment. One example of criteria used for determining if the power rail passes the power sequence is described below in the discussion associated with FIG. 6.

If the power rail meets the criteria (conditional block 520, "yes" leg), then the monitoring logic generates and stores a pass indicator for the power rail (block 525). In one embodiment, the monitoring logic stores the pass indicator in a pass/fail status register. In one embodiment, the pass indicator is a single bit. If the power rail does not meets the criteria (conditional block 520, "no" leg), then the monitoring logic generates and stores a fail indicator for the power rail (block 530). In one embodiment, the monitoring logic stores the fail indicator in the pass/fail status register. In one embodiment, the fail indicator is a single bit. Next, the monitoring logic also stores additional information (e.g., voltage levels, timing data) indicating why the power rail failed to meet the criteria (block 535). After blocks 525 and 535, the monitoring logic provides the generated indicator and any additional information to an external entity (block 540). The external entity can be a device, person, computer system, storage location, or other target. Providing the generated indicator and any additional information to the external entity can be defined as conveying the data to the external entity or providing the generated indicator and any additional information to the external entity can be defined as allowing the external entity access to the data. After block 540, method 500 ends.

Turning now to FIG. 6, one embodiment of a method 600 for determining if a power rail meets power sequence criteria is shown. In the example shown, the voltage of a power rail input is sampled at a time indicated by a timing interval starting boundary register (block 605). Next, the voltage of a power rail input is sampled at a time indicated by a timing interval ending boundary register (block 610). In one embodiment, the timing interval starting boundary register and the timing interval ending boundary register are programmed with the start time and the end time of the power rail start-up sequence timing interval.

Then, control logic determines if the voltage of the power rail meets the voltage specification at the boundaries of the timing interval (conditional block 615). One embodiment for determining if the power rail meets the voltage specification at the boundaries of the timing interval is described further below in the discussion associated with FIG. 7. If the power rail meets the voltage specification at the boundaries of the timing interval (conditional block 615, "yes" leg), then the control logic generates a pass indicator for the power rail (block 620). If the power rail does not meet the voltage specification at the boundaries of the timing interval (conditional block 615, "no" leg), then the control logic generates a pass indicator for the power rail (block 625). After blocks 620 and 625, method 600 ends. Also, after blocks 620 and 625, the indicator(s) can be conveyed to or retrieved by an external entity.

Referring now to FIG. 7, one embodiment of a method 700 for determining if a power rail meets a voltage specification at the boundaries of a programmable timing interval is shown. In the example shown, control logic samples a voltage of a power rail at a first boundary of a timing interval (block 705). In one embodiment, the first boundary of the timing interval is programmed via software. The control logic stores the sampled voltage obtained on the first boundary of the timing interval (block 710). Also, the control logic samples a voltage of the power rail at a second boundary of the timing interval (block 715). The control logic stores the sampled voltage obtained on the second boundary of the timing interval (block 720).

Then, the control logic determines if the sampled voltage obtained on the first boundary of the timing interval is less than a first voltage (conditional block 725). If the sampled voltage obtained on the first boundary of the timing interval is less than a first voltage (conditional block 725, "yes" leg), then the control logic determines if the sampled voltage obtained on the first boundary of the timing interval is greater than a second voltage (conditional block 730). In one embodiment, the first voltage and second voltage are stored in registers which are programmable via software. If the sampled voltage obtained on the first boundary of the timing interval is greater than the first voltage (conditional block 725, "no" leg), then the control logic generates a fail indicator for the power rail (block 735). The control logic also provides the sampled voltage values from the first and second boundaries of the timing interval to an external entity (block 740).

If the sampled voltage obtained on the second boundary of the timing interval is greater than the second voltage (conditional block 730, "yes" leg), then the control logic generates a pass indicator for the power rail (block 745). If the sampled voltage obtained on the second boundary of the timing interval is less than the second voltage (conditional block 730, "no" leg), then the control logic generates a fail indicator for the power rail (block 735). The control logic also provides the sampled voltage values from the first and second boundaries of the timing interval to an external entity (block 740). After blocks 740 and 745, method 700 ends.

Turning now to FIG. 8, one embodiment of a method 800 for monitoring multiple power rails is shown. In the example shown, control logic monitors a given power rail (block 805). Monitoring can involve taking voltage measurements of the given power rail at specified times. The control logic generates a pass/fail indicator for the given power rail based on the monitoring of the given power rail (block 810). The control logic stores the pass/fail indicator and any additional measurements for a failing power rail (block 815). Then, if there are any other power rails to monitor (conditional block 820, "yes" leg), method 800 returns to block 805 to monitor the next power rail.

If there are no other power rails to monitor (conditional block 820, "no" leg), the control logic determines if all power rails passed their corresponding power sequence specification (conditional block 825). If all power rails passed their corresponding power sequence specification (conditional block 825, "yes" leg), then the control logic provides a pass indication to an external entity (block 830). The external entity can be a device, person, computer system, storage location, or other target. Providing the pass indication to the external entity can be defined as conveying the pass indication to the external entity or providing the pass indication to the external entity can be defined as allowing the external entity access to the pass indication.

It is noted that any of various techniques can be used for providing the pass indication to the external entity, depending on the embodiment. For example, the techniques for providing the pass indication can include using a single pin, light emitting diode (LED), radio frequency (RF) signal, infrared, wireless, audible, register access, debug tool access, secured access, BIOS post codes, data written to a storage location, video output, and others. Other techniques for providing indications or other information to an external entity are possible and are contemplated. Additionally, any of the embodiments described herein can implement any of the above techniques for providing pass/fail indications and for providing additional information (e.g., voltage levels, timing data) to an external entity.

If not all power rails passed their corresponding power sequence specification (conditional block 825, "no" leg), then the control logic provides indication(s) of which power rail(s) failed to the external entity (block 835). The control logic can also provide additional information, such as timing and voltage level values detected during the power sequence for the failing power rail(s), to the external entity. After blocks 830 and 835, method 800 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   processing logic;
   a plurality of registers; and
   control logic configured to:
   monitor a power rail generated by a voltage regulator, wherein the power rail provides power to at least a portion of the processing logic;
   determine whether a voltage transition occurs during a given time window, wherein the given time window is bounded by first and second time boundaries;
   generate a pass indication and a fail indication for the power rail during a power sequence responsive to determining the voltage transition occurs but outside of the given time window; and
   provide the pass indication and the fail indication to an external entity subsequent to completion of the power sequence.

2. The system as recited in claim 1, wherein voltage levels of the voltage transition are specified in a first plurality of registers and the first and second time boundaries of the given time window are specified in a second plurality of registers.

3. The system as recited in claim 1, wherein the control logic is further configured to:
   capture level and timing data associated with the power rail;
   store, in one or more registers, the level and timing data; and
   enable the one or more registers to be read by the external entity subsequent to completion of the power sequence to indicate why a system malfunction occurred.

4. The system as recited in claim 1, wherein a register of the plurality of registers stores a first voltage value, and wherein the control logic is further configured to determine if the power rail exceeds the first voltage value during the power sequence.

5. The system as recited in claim 1, wherein the plurality of registers comprise a first register for storing a voltage level at an end of the power sequence and a second register for storing a time of a captured voltage transition.

6. The system as recited in claim 1, wherein the control logic is further configured to store additional information indicating why the power rail failed to meet one or more additional criteria specified in one or more registers of the plurality of registers.

7. The system as recited in claim 1, wherein the control logic is further configured to:
   monitor a plurality of power rails generated by a plurality of voltage regulators;
   generate and store, in the plurality of registers, a plurality of indications of pass or failure for each power rail of the plurality of power rails during a power sequence; and
   chain together and convey a plurality of pass or fail indications to the external entity.

8. A method comprising:
   monitoring a power rail generated by a voltage regulator, wherein the power rail provides power to at least a portion of processing logic;
   determining whether a voltage transition occurs during a given time window, wherein the given time window is bounded by first and second time boundaries;
   generating a pass indication and a fail indication for the power rail during a power sequence responsive to determining the voltage transition occurs but outside of the given time window; and
   providing the pass indication and the fail indication to an external entity subsequent to completion of the power sequence.

9. The method as recited in claim 8, further comprising wherein voltage levels of the voltage transition are specified in a first plurality of registers and the first and second time boundaries of the given time window are specified in a second plurality of registers.

10. The method as recited in claim 8, further comprising:
capturing level and timing data associated with the power rail;
storing, in one or more registers, the level and timing data; and
enabling the one or more registers to be read by the external entity subsequent to completion of the power sequence to indicate why a system malfunction occurred.

11. The method as recited in claim 8, wherein a register of the plurality of registers stores a first voltage value, wherein the method further comprising determining if the power rail exceeds the first voltage value during the power sequence.

12. The method as recited in claim 8, wherein the plurality of registers comprise a first register for storing a voltage level at an end of the power sequence and a second register for storing a time of a captured voltage transition.

13. The method as recited in claim 8, further comprising storing additional information indicating why the power rail failed to meet one or more additional criteria specified in one or more registers of the plurality of registers.

14. The method as recited in claim 8, further comprising:
monitoring a plurality of power rails generated by a plurality of voltage regulators;
generating and storing, in the plurality of registers, a plurality of indications of pass or failure for each power rail of the plurality of power rails during a power sequence; and
chaining together and convey a plurality of pass or fail indications to the external entity.

15. An apparatus comprising:
a plurality of voltage regulators;
a plurality of registers; and
control logic;
wherein the control logic is configured to:
monitor a power rail generated by a voltage regulator;
determine whether a voltage transition occurs during a given time window, wherein the given time window is bounded by first and second time boundaries;
generate a pass indication and a fail indication for the power rail during a power sequence responsive to determining the voltage transition but outside of the given time window; and
provide the pass indication and the fail indication to an external entity subsequent to completion of the power sequence.

16. The apparatus as recited in claim 15, wherein voltage levels of the voltage transition are specified in a first plurality of registers and the first and second time boundaries of the given time window are specified in a second plurality of registers.

17. The apparatus as recited in claim 15, wherein the control logic is further configured to:
capture level and timing data associated with the power rail;
store, in one or more registers, the level and timing data; and
enable the one or more registers to be read by the external entity subsequent to completion of the power sequence to indicate why a system malfunction occurred.

18. The apparatus as recited in claim 15, wherein a register of the plurality of registers stores a first voltage value, and wherein the control logic is further configured to determine if the power rail exceeds the first voltage value during the power sequence.

19. The apparatus as recited in claim 15, wherein the plurality of registers comprise a first register for storing a voltage level at an end of the power sequence and a second register for storing a time of a captured voltage transition.

20. The apparatus as recited in claim 15, wherein the control logic is further configured to store additional information indicating why the power rail failed to meet one or more additional criteria specified in one or more registers of the plurality of registers.

* * * * *